S. MICKLEY.
Corn Planter.

No. 107,280. Patented Sept. 13, 1870.

Witnesses.
Harry King

Inventor.
Solomon Mickley
per
Alexander Mason
Atty.

United States Patent Office.

SOLOMON MICKLEY, OF YORK, ASSIGNOR TO HIMSELF AND SAMUEL LEATHERY, OF ROSSVILLE, PENNSYLVANIA.

Letters Patent No. 107,280, dated September 13, 1870.

IMPROVEMENT IN CORN-PLANTER.

The Schedule referred to in these Letters Patent and making part of the same.

*To all whom it may concern:*

Be it known that I, SOLOMON MICKLEY, of York, in the county of York and in the State of Pennsylvania, have invented certain new and useful Improvements in Corn-Planter; and do hereby declare the following is a full, clear, and exact description thereof, reference being had to the accompanying drawing and to the letters of reference marked thereon making a part of this specification.

The nature of my invention consists in the construction and arrangement of a "corn-planter," which is so arranged as to plant corn and sow fertilizer almost simultaneously, and can be adjusted so as to drop the corn either above or below the fertilizer.

In order to enable others skilled in the art to which my invention appertains to make and use the same, I will now proceed to describe its construction and operation, referring to the annexed drawing, in which—

Figure 1:
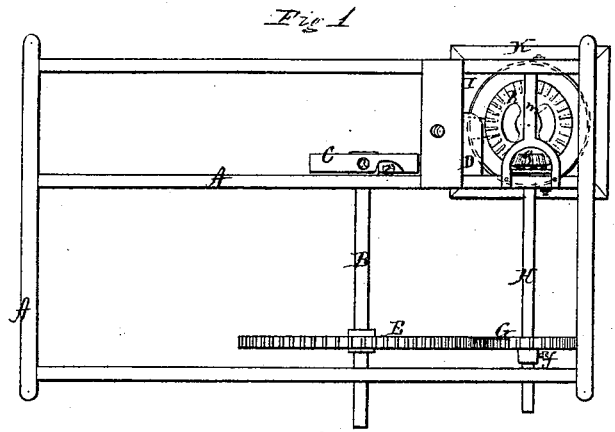
Figure 1 is a bottom view of my machine.
Figure 3:
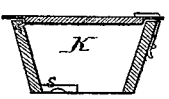
Figure 3 is a vertical section of the fertilizer-hopper.
Figure 2:
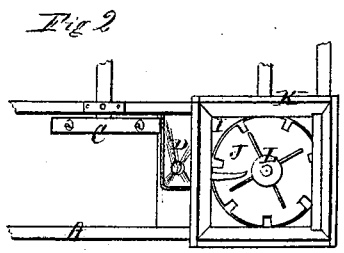
Figure 2 is a plan view of the same.

In the drawing, I have not deemed it necessary to show any more than what is necessary to illustrate what I consider as new and desire to have patented.

A represents the frame-work of my machine, upon which, in suitable bearings, is placed a horizontal shaft, B.

On the end of the shaft B, within the frame, is attached the corn-dropper C, consisting of a wheel, provided with a series of holes through its rim or periphery, said holes being an equal distance apart, and headed pins, $a\ a$, inserted in the same from the inside.

Figure 5:
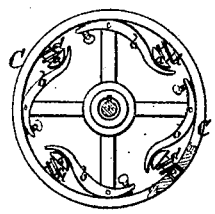
Figure 5 is a side view of the corn-dropping mechanism.

The heads of these pins bear against pivoted levers, $b\ b$, as shown in fig. 5, and surrounding each of said pins, between the head and the inner side of the rim of the wheel C is a spiral spring, $d$, which forces the pin inward, leaving a recess in the outer periphery of the wheel.

A corn-hopper being arranged in any suitable manner for the upper portion of the wheel C to work in, the corn will fall into these recesses thus formed, and, as each recess approaches the hopper D, the lever $b$ strikes a friction-roller, $e$, attached in the side of the frame, so as to force the pin $a$ outward, ejecting the grain of corn into said hopper D, from which it passes into the ground.

As soon as the lever $b$ leaves the roller $e$, the spring $d$ throws the pin $a$ inward again to its original position.

The shaft B may either itself form the axle on which the driving-wheels are placed, or it may be put in motion by any suitable means from the axle.

On said shaft is keyed or otherwise secured a cog-wheel, E, which gears with a similar wheel, G, secured, by a set-screw, $f$, on a shaft, H, which runs parallel with the shaft B.

The object of making the cog-wheel G adjustable on the shaft H by means of the set-screw $f$ will be hereinafter described.

Upon the inner end of the shaft H is secured a bevel-pinion, $g$, which gears with a bevel or miter-wheel, $h$, placed upon an upright shaft, $k$, which has its bearings in two cross-bars, $m$, in the frame A.

Directly over the wheel $h$ in the frame A is placed a plate, I, provided with an annular recess, having an opening directly over the hopper D, as shown by dotted lines in fig. 1.

The shaft $k$ passes through the center of a wheel or disk, J, which forms the bottom of the fertilizer-hopper K.

This disk is, on its under side, provided with pins, $i\ i$, between which fit the ends of a spring-bar, $n$, which is fastened on the shaft $k$, and thus the disk J is made to revolve when the wheel $h$ and shaft $k$ are in motion.

In the edges of the disk J is a series of notches, at equal distances apart, and on the under side of said disk is placed a ring, $p$, provided with a cross-bar, $t$, through which the shaft $k$ also passes.

On one side of each notch or slot in the disk J is a lug, $r$, extending downward as far as the width of the ring $p$, said ring being also provided with lugs, $r'$, so as to form on the under side of the disk, around the edges, a series of small receptacles for fertilizer, which passes down through the slots in the edge of the disk.

Figure 4:
Figure 4 is a bottom view of the fertilizer-distributing wheel.

These receptacles may be increased or diminished in size by turning the ring $p$, it being made adjustable by means of a bolt and nut through a curved slot in the cross-bar $t$, as shown in fig. 4.

The fertilizer in each of these receptacles is deposited in rotation through the opening in the recessed plate I, into the hopper D, and from thence into the ground.

Within the fertilizer-hopper K, upon the shaft $k$, is placed the agitator L, for stirring the fertilizer, and preventing its clogging.

In the side of the hopper K is placed a scraper, $s$, above the point where the fertilizer is passed out from the recessed plate I, which scraper prevents any more of the fertilizing material than what is contained in each receptacle from passing out.

The fertilizer may be deposited in the hopper D either immediately before or immediately after the corn has been dropped in the same. This may be regulated by changing the position of the cog-wheel G on the shaft H, or, rather, by turning the shaft H within the hub of the wheel G, and fastening the wheel at the desired point by the set-screw *f*.

Having thus fully described my invention,

What I claim as new, and desire to secure by Letters Patent, is—

1. The wheel C, constructed, as described, with holes through its rim, and provided with headed pins *a a*, levers *b b*, and springs *d d*, all substantially as and for the purposes herein set forth.

2. The notched or slotted disk J, provided with lugs *r r*, in combination with the adjustable ring *p*, having lugs *r' r'*, all constructed and arranged to operate substantially as and for the purposes herein set forth.

3. In combination with the disk J, constructed as described, the plate I, having an annular recess, provided with an opening or outlet directly above the hopper D, substantially as and for the purposes herein set forth.

4. The combination of the corn-dropper C and fertilizer-distributer J, constructed and arranged as described, and adjusted so as to drop the corn and fertilizer either simultaneously, or one in advance of the other, by means of the cog-wheel G, adjusted upon the shaft H, substantially as herein set forth.

In testimony that I claim the foregoing, I have hereunto set my hand this 21st day of May, 1870.

SOLOMON MICKLEY.

Witnesses:
A. N. MARR,
ELI SEITZ.